(No Model.)
P. C. WRIGHT.
DEVICE TO PREVENT RETROGRADE MOVEMENT.
No. 298,930. Patented May 20, 1884.
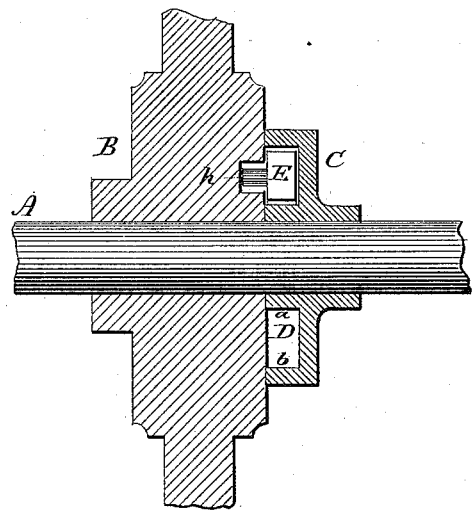
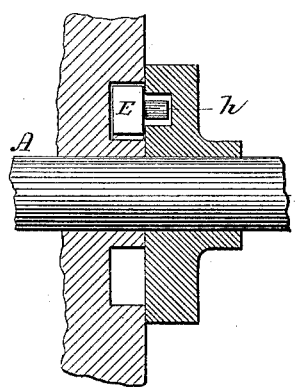
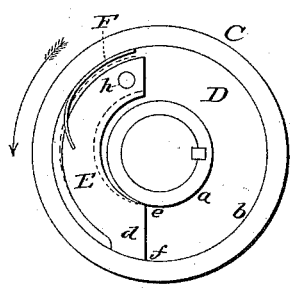
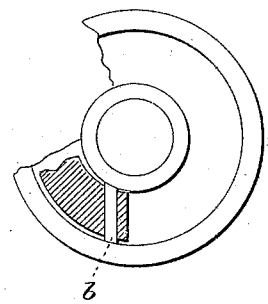
Witnesses.
J. N. Shumway
Chs. A. Earle
Palmer C. Wright
Inventor
By Atty.
Wm. A. Earle

UNITED STATES PATENT OFFICE.

PALMER C. WRIGHT, OF NEW HAVEN, CONNECTICUT.

DEVICE TO PREVENT RETROGRADE MOVEMENT.

SPECIFICATION forming part of Letters Patent No. 298,930, dated May 20, 1884.

Application filed March 3, 1884. (No model.)

*To all whom it may concern:*

Be it known that I, PALMER C. WRIGHT, of New Haven, in the county of New Haven and State of Connecticut, have invented a new Improvement in Devices to Prevent Retrograde Movement in Sewing-Machines; and I do hereby declare the following, when taken in connection with accompanying drawings and the letters of reference marked thereon, to be a full, clear, and exact description of the same, and which said drawings constitute part of this specification, and represent, in—

Figure 1, a longitudinal central section; Fig. 2, a face view of the disk; Figs. 3 and 4, modifications.

This invention relates to a device to be used between the driving pulley or wheel of a sewing-machine and its shaft, whereby when running in the right direction the shaft will engage with the pulley or wheel to impart rotation to it to communicate motion to the sewing-machine, but if in the opposite direction, then the shaft will disengage from the wheel, allowing the shaft to revolve in the reverse direction, but without effect upon the driving pulley or wheel; and the invention consists in the clutch hereinafter described, and more particularly recited in the claims.

A represents the driving-shaft of a sewing-machine table; B, the hub of the fly-wheel, the wheel arranged loose on the shaft.

C is a disk rigidly attached to the shaft, and so as to revolve with the shaft in whatever direction it may be turned. The face of this disk next the hub of the wheel is constructed with a concentric recess, D, forming parallel walls $a$ $b$, and these walls substantially parallel with the axis of the shaft. Into this recess a dog, E, is placed, loose and free. At the nose end $d$ the dog is constructed to take a bearing upon the inside wall of the recess, as at $e$, and upon the outside wall, as at $f$, these two points being distant from each other a little greater than the width of the recess radially. From the nose toward the tail the dog is less in width than the width of the recess, so that the tail end has considerable play within the recess.

F is a spring attached to the back of the dog, and so as to bear against the outside wall, the action of the spring being to turn the tail of the dog inward or toward the center, and in such turning of the dog the two opposite points of the nose come to a hard bearing on the respective walls of the recess, and so that if the dog be held in that position it must partake of the revolution of the disk; but if the power be applied to the tail of the dog to turn it outward against the force of the spring, as seen in broken lines, Fig. 2, then the two bearing-points of the nose are turned away from the positive bearing upon the two walls, so as to leave the disk and dog free from each other. On the tail end of the dog is a stud, $h$, which enters a corresponding hole in the adjacent face of the hub of the wheel or pulley, as seen in Fig. 1. Applied as in Fig. 1, the disk fixed to the shaft and the wheel loose thereon, the active direction of rotation of the shaft is indicated by the arrow in Fig. 2, and the motion of the shaft must be communicated to the wheel B by the connection between it and the dog E. The resistance to the turning of the wheel B is in the direction opposite to the rotation of the driving-shaft; hence that resistance tends to bear the tail of the dog inward, and so as to cramp the nose of the dog between the two walls of the disk, and this cramping of the dog firmly engages the disk, and because of its connection with the wheel the wheel will be correspondingly engaged with the disk and shaft, and hence partake of its rotation; but suppose the rotation of the shaft A be in the opposite or wrong direction, then the resistance of the wheel is against the tail of the dog, tending to turn it outward, and so as to relieve the nose from its cramped position against the two walls of the recess. In that condition the dog is free from engagement with the disk, and the shaft and disk may revolve freely in that reverse direction without imparting rotation to the wheel B. A certain amount of play is necessary around the stud $h$ in the hub of the wheel in order to permit the necessary radial movement of the tail of the dog, as seen in Figs. 1 and 3. The spring F is desirable, in that it enables the dog to make firm engagement at any point at which it may be placed in the rotation of the wheel with relation to the disk; but the spring may be omitted and dependence had upon the weight of the tail of the dog to bring it into its proper cramping condition. In some cases the device to prevent retrograde movement in sewing-machines is best applied to the shaft of the machine itself, instead of to the wheel on the shaft of the table. The application, however, is the same in either case, it being understood that when applied directly to the machine, A represents the main shaft of the machine, and B the pulley thereon through which the power is communicated to the machine.

Instead of making the recess in the disk C and connecting the tail of the dog with the wheel, as shown, this may be reversed—that is, the recess made in the hub of the wheel, as seen in Fig. 3, and the stud on the dog enter a corresponding hole in the fixed disk. In that case, as the disk revolves in one direction it cramps the dog upon the wheel, and in the reverse direction carries the dog around with it, but without engagement with the wheel.

In Fig. 2 I have represented the dog as having its bearing or cramping points an integral part of the dog; but instead of making the dog thus solid a bar, $l$, may be introduced through a hole in the dog at its nose end, and so as to take a bearing against the two walls of the recess, as seen in Fig. 4, when the tail of the dog is turned outward; or, when the tail of the dog is forced inward, then the two ends of the bar cramp in like manner as the nose of the dog before described.

I do not wish to be understood as claiming, broadly, a clamping device which will engage the wheel with the shaft in one direction and prevent such engagement in the reverse direction, as such, I am aware, is not new.

I claim—

1. The herein-described device for preventing retrograde movement in sewing-machines, consisting of the wheel or pulley B, loose on the shaft, the disk C, fixed on the shaft, one of said parts B C constructed with a concentric recess, D, on its side next the other part, and a dog arranged in said recess, constructed at its nose end to engage the two walls of the recess in the right direction of revolution, but free therefrom in the opposite direction, the said dog at its tail end connected with the said other part, B, by a stud, $h$, on the one part and corresponding slot in the other to permit play of the stud, and whereby the rotation of the one is communicated to the other when turned in the driving direction, but left free when turned in the opposite direction, substantially as described.

2. The combination of the disk C, fixed to the shaft, constructed with the concentric recess D in one of its sides, the dog E, arranged loosely in said recess, the bar $l$ through the nose of the dog and arranged to take its bearing against the opposite walls of the recess in one direction, but free in the opposite, and the tail end of the dog constructed for engagement with a device loose upon the shaft, substantially as described.

PALMER C. WRIGHT.

Witnesses:
JOHN E. EARLE,
JOS. C. EARLE.